(12) United States Patent
Mason (10) Patent No.: US 11,448,313 B2
(45) Date of Patent: Sep. 20, 2022

(54) PRESSURE REGULATOR VALVE

(71) Applicant: SUPERIOR TRANSMISSION PARTS, INC., Tallahassee, FL (US)

(72) Inventor: Dean Mason, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 0 days.

(21) Appl. No.: 16/177,655

(22) Filed: Nov. 1, 2018

(65) Prior Publication Data

US 2019/0128409 A1  May 2, 2019

Related U.S. Application Data

(60) Provisional application No. 62/580,631, filed on Nov. 2, 2017, provisional application No. 62/752,539, filed on Oct. 30, 2018.

(51) Int. Cl.
*F16H 61/02* (2006.01)
*G05D 16/10* (2006.01)
(Continued)

(52) U.S. Cl.
CPC ..... *F16H 61/0251* (2013.01); *F16H 61/0021* (2013.01); *F16K 11/0708* (2013.01);
(Continued)

(58) Field of Classification Search
CPC ............ F16H 61/0021; F16H 61/0251; F16H 2061/0062; F16H 2061/0253; F16H 2061/0255; F16H 2061/0258; F16H 2061/026; G05D 16/10; F16K 11/0708; F16K 25/04; F16K 11/0712; F16K 31/0603; F16K 27/048; F16K 27/041; B23P 15/001; B23P 6/00; F15B 13/0402; Y10T 29/49407; Y10T 29/49821; Y10T 29/49718; Y10T 29/49726; Y10T 29/4973; Y10T 137/0486; Y10T 137/0491; Y10T 137/0497; Y10T 137/6004; Y10T 137/5987; Y10T 137/6065; Y10T 137/86726; Y10T 137/8671; Y10T 137/86574; Y10T 137/86493; Y10T 137/599; Y10T 137/6011
USPC ... 137/15.17, 15.19, 315.09, 315.27, 625.69, 137/625.29, 625.2, 625, 15.18, 315.03, 137/454.2, 315.11; 475/118, 120, 127; 91/478, 468; 192/87.13, 87.19, 109,
(Continued)

(56) References Cited

U.S. PATENT DOCUMENTS

| 525,462 A | * | 9/1894 | Jones | ............... | F15B 13/04 |
| | | | | | 137/625.69 |
| 1,820,653 A | * | 8/1931 | Ernst | ............... | F16K 11/0708 |
| | | | | | 137/625.48 |

(Continued)

*Primary Examiner* — Craig J Price (57) ABSTRACT

The present invention solves bore wear due to inefficient design of OEM pressure regulator valve through an improved pressure regulator valve with lands having narrower diameters and longer lengths, the lands additionally having a grooved design, and a second land having a beveled edge to stabilize fluid regulation. Narrower lands allow for better ATF lubrication in a bore. Longer lands allow for the valve to be dropped into a bore to interact with non-damaged lengths of the bore without further machining. The beveled edge regulates pressure, further reducing bore wear.

10 Claims, 4 Drawing Sheets

(51) Int. Cl.
*F16H 61/00* (2006.01)
*F16K 11/07* (2006.01)
*F16K 25/04* (2006.01)

(52) U.S. Cl.
CPC ............. *F16K 25/04* (2013.01); *G05D 16/10* (2013.01); *F16H 2061/0062* (2013.01); *F16H 2061/0253* (2013.01); *Y10T 29/49407* (2015.01); *Y10T 137/0486* (2015.04); *Y10T 137/6011* (2015.04)

(58) Field of Classification Search
USPC ....... 192/109 f, 3.3, 3.28, 3.29; 74/753, 754, 74/364; 477/115–164; 60/357; 29/89.121, 402.06, 402.08, 426.4, 29/402.01–402.21, 890.124, 890.132, 29/426.1–426.6
See application file for complete search history.

(56) References Cited

U.S. PATENT DOCUMENTS

| | | | | |
|---|---|---|---|---|
| 2,307,585 A * | 1/1943 | Harrington | ............. | F15B 13/04 137/625.69 |
| 3,035,414 A * | 5/1962 | Smith | .................. | B66D 1/08 60/436 |
| 3,557,824 A * | 1/1971 | Krehbiel | ................ | F16K 11/07 137/375 |
| 3,763,746 A * | 10/1973 | Walters | ................. | F15B 5/003 91/433 |
| 4,011,891 A * | 3/1977 | Knutson | .................. | F15B 9/08 137/625.62 |
| 4,546,786 A * | 10/1985 | Koike | .................... | B62D 5/08 137/115.08 |
| 4,549,718 A * | 10/1985 | Seger | .................... | F16K 47/04 251/121 |
| 4,617,967 A * | 10/1986 | Read | ................... | F15B 13/0402 137/596.17 |
| RE33,053 E * | 9/1989 | Seger | .................... | F16K 47/04 251/121 |
| 4,941,508 A * | 7/1990 | Hennessy | ........... | F16K 11/0708 137/625.69 |
| 4,953,416 A * | 9/1990 | Komatsu | .................. | B62D 5/08 180/442 |
| 5,031,656 A * | 7/1991 | Benford | .............. | F16H 61/0276 134/166 C |
| 5,839,988 A * | 11/1998 | Marusue | .................. | F16H 61/06 477/130 |
| 6,450,194 B1 * | 9/2002 | Wasson | ............... | F15B 13/0402 137/351 |
| 6,634,377 B1 * | 10/2003 | Stafford | ............. | F16H 61/0276 137/315.11 |
| 6,689,007 B2 * | 2/2004 | Warnke | .............. | F16H 61/0276 137/247.17 |
| 6,712,726 B1 * | 3/2004 | Jackson | .............. | F16H 61/0021 475/127 |
| 6,826,908 B1 * | 12/2004 | Stafford | ............. | F16H 61/0021 60/357 |
| 7,104,273 B1 * | 9/2006 | Stafford | .................. | F16H 61/14 137/15.17 |
| 7,314,128 B2 * | 1/2008 | Gunderson | ......... | F16D 25/0638 192/85.41 |
| 8,387,254 B2 * | 3/2013 | Fathauer | ............. | F16K 31/0603 29/890.121 |
| 9,248,527 B2 * | 2/2016 | Fathauer | ............. | F16K 31/0603 |
| 10,156,246 B2 * | 12/2018 | Coolidge | ............. | F15B 11/161 |
| 2004/0089355 A1 * | 5/2004 | Nirasawa | ......... | G05D 16/101 137/625.69 |
| 2005/0005971 A1 * | 1/2005 | Stafford | .................. | F16H 61/14 137/454.2 |
| 2008/0258090 A1 * | 10/2008 | Najmolhoda | ......... | F16K 31/426 251/129.15 |
| 2010/0300828 A1 * | 12/2010 | Kinch | ................ | F15B 13/0433 192/85.63 |
| 2011/0067771 A1 * | 3/2011 | Navale | ................ | F16K 11/0708 137/625.25 |
| 2011/0088236 A1 * | 4/2011 | Fathauer | ............... | B23P 15/001 29/402.08 |
| 2013/0125995 A1 * | 5/2013 | Long | ........................ | B60K 6/48 137/1 |
| 2013/0333218 A1 * | 12/2013 | Fathauer | ............. | F16H 61/0009 29/890.121 |
| 2015/0323085 A1 * | 11/2015 | Greeb | ................. | F16K 27/048 137/625.46 |
| 2016/0252178 A1 * | 9/2016 | Dial | .................... | F16H 61/0276 137/15.17 |

* cited by examiner

PRESSURE REGULATOR VALVE

CROSS-REFERENCE TO RELATED APPLICATIONS

The present application claims the benefit of U.S. provisional application No. 62/580,631, filed on Nov. 2, 2017, and U.S. provisional application No. 62/752,539, filed on Oct. 30, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention pertains to the field of automotive transmissions, and specifically pressure regulator valves used in transmissions to determine the amount of oil flowing from the transmission pump. More specifically, the present invention relates to a grooved pressure regulator valve that can be dropped-in, or inserted into a transmission without additional machining, to improve several performance aspects of a transmission.

Brief Description of the Related Art

An original equipment manufacturer (OEM) pressure regulator valve has been designed for operation in a Ford 5R110W automatic transmission, which is stilled widely used and manufactured. The 5R110W transmission is a five-speed transmission designed to handle large amounts of torque generated by 6.0 L and 7.3 L Power Stroke Diesel engines. While the 5R110W transmission provides notable benefits, such as increased fuel economy, the transmission has several design flaws which lead to common issues.

Regarding the several design flaws of the pressure regulator valve of the 5R110W transmission, the dimensions of the factory-standard pressure regulator valve lead to bore wear and sticking. Bore wear, and resulting valve wear, occurs when there is not a sufficient layer or barrier of automatic transmission fluid ("ATF") between the valve and bore. Sticking occurs when tiny particles, such as metal and/or carbon flakes become lodged between the valve and bore. The increased friction between valve and bore due to such tiny particles causes damage to both parts over time.

Further, the squared edges of the factory-standard land design (referred to as "squared lands") leads to pressure oscillations that make pressure readings inaccurate. Such squared lands lead to "noisy" pressure signals, whereby pressure readings rapidly oscillated between 137.895-275.79 kPa (kilopascal), or 20-40 PSI (pounds per square inch), at around 180 Hz or more. Due to the factory-standard valve diameter, there is only an area of about 0.508 mm (millimeters), or 0.020 in (inches), for the main line dump land to exhaust a large volume of fluid as the squared lands cycle in and out. Such noise makes readings inaccurate, but it also increases bore wear. The relatively small area for fluid to exhaust during the land cycling leads to longer, faster cycle distances. This naturally creates added friction and wear between the valve and bore.

Lastly, the longer and faster cycle distances of the valve lands create a limiting effect on flow to secondary circuits, such as the torque converter feed. Current cooler pressure/flow under the factory-standard valve is 7.5708 liters per minute (2 gallons per minute) at 137.895 kPa (20 PSI).

Beyond the factory-standard pressure regulator valve, there are two other known pressure regulator valves that have been designed to solve one or more of the issues presented above.

The first of these after-market valves is produced by Sonnax®. The Sonnax® valve is an oversized valve that is in all ways identical to the factory-standard valve, except that the land diameters are larger. This requires that the standard bore be enlarged by a reamer to accept the larger valve. This design has obvious drawbacks, such as the necessary enlargement of the bore and remaining issues with the squared land design.

The second after-market valve is produced by TransGo®. This valve is a "drop-in" replacement part, which is an industry term for a replacement part of modified design requiring no additional machining processes. The TransGo® valve has solid lands with lengths differing from the factory-standard valve, but otherwise adopting the factory-standard land diameters. Further, the TransGo® valve has a unique stem length to accommodate a boost sleeve and pressure regulator spring.

BRIEF SUMMARY OF THE INVENTION

The present invention has been developed to replace factory-standard or original equipment manufacturer (OEM) pressure regulator valves in valve bodies of a Ford 5R110W transmission and other transmissions based upon the 5R110W design. Further, the present invention has been developed to reduce the impact of the identified design issues that cause damage necessitating the replacement of the OEM pressure regulator valve. An improved pressure regulator valve has been designed with lengthened lands such that the pressure regulator valve is axially supported upon insertion within a bore of the valve body along an unworn portion of the bore. Further, the pressure regulator valves of the present invention are designed to be drop-in parts, meaning that they replace the OEM parts without requiring additional machining processes. This design provides notable benefits over certain prior art pressure regulator valves which require a reamer to enlarge the bore for insertion of a new pressure regulator valve.

Reduced bore wear is achieved by the pressure regulator valve of the present invention through three significant factors. First, the pressure regulator valves of the present invention provide regulation, specifically a reduced cycle rate and distance, due to a unique length, angle, and location of a bevel on a second land along an end in proximity to a third land. The bevel allows the pressure regulator valve to meter fluid exhaust at a progressive rate, instead of exhausting fluid in an all-or-none manner. A progressive rate of fluid exhaust quiets pressure oscillation by shortening and slowing the fluid exhaust cycle, which in turn reduces bore wear. Second, the pressure regulator valves of the present invention have reduced land diameters, which provides additional clearance for an adequate boundary layer or constant flowing film of ATF between the pressure regulator valve and bore. This allows the pressure regulator valve to effectively hydroplane on ATF rather than scrape the bore when clearance is below ATF sheer thickness. Lastly, the pressure regulator valve of the present invention includes grooved lands. Grooved lands reduce overall frictional drag coefficient due to less bore contact and boundary layer resistance with the pressure regulator valve, furnish lubrication pockets and facilitate flushing action to reduce tension, and provide areas to collect particulates that would otherwise normally lodge between the valve lands and bore. The grooved lands therefore are advantageous for reducing drag, increasing lubrication, and providing self-cleaning.

In a preferred embodiment of the invention, a pressure regulator valve for use in a 5R110W automatic transmission comprises a cylindrical valve stem having opposing first and second ends; a first land positioned along the valve stem near the first end; a second land positioned along the valve stem closer to the second end relative to the first land and spaced apart from the first land; a third land positioned along the valve stem closer to the second end relative to the second land and spaced apart from the second land; a fourth land positioned along the valve stem closer to the second end relative to the third land and spaced apart from the third land; wherein each of the first, second, third, and fourth lands are grooved; wherein each of the first, second, third, and fourth lands have a diameter less than 18.47088 mm (0.7272 in); and wherein an end of the second land closest to the third land is beveled.

Further embodiments of the pressure regulator valve may have first, second, third, and fourth land diameters between 18.4607 mm (0.7268 in) and 18.4683 mm (0.7271 in). This range allows the pressure regulator valve to operate properly while providing the listed benefits of the present invention. Each of the first, second, and third lands would have an identical diameter chosen from the listed range.

Further embodiments of the pressure regulator valve have the bevel located between 36.83 mm (1.450 in) and 41.91 mm (1.650 in), which is measured from an end of the first land that is closest to the second land to the end of the second land. This means that the angle of the bevel begins and terminates between the stated range.

Additional embodiments of the pressure regulator valve include varying orientations of the grooved lands. As shown in the drawings, embodiments may have differing numbers of concentric, contiguous, and alternating depressed areas and raised areas on each land.

BRIEF DESCRIPTION OF THE SEVERAL VIEWS OF THE DRAWING

A better understanding of the invention will be had with respect to the accompanying drawings wherein.

DETAILED DESCRIPTION OF THE INVENTION

The present invention solves bore wear due to inefficient design of OEM pressure regulator valve through an improved pressure regulator valve with lands having narrower diameters and longer lengths, the lands additionally having a grooved design, and a second land having a beveled edge to stabilize fluid regulation.

Figure 1:
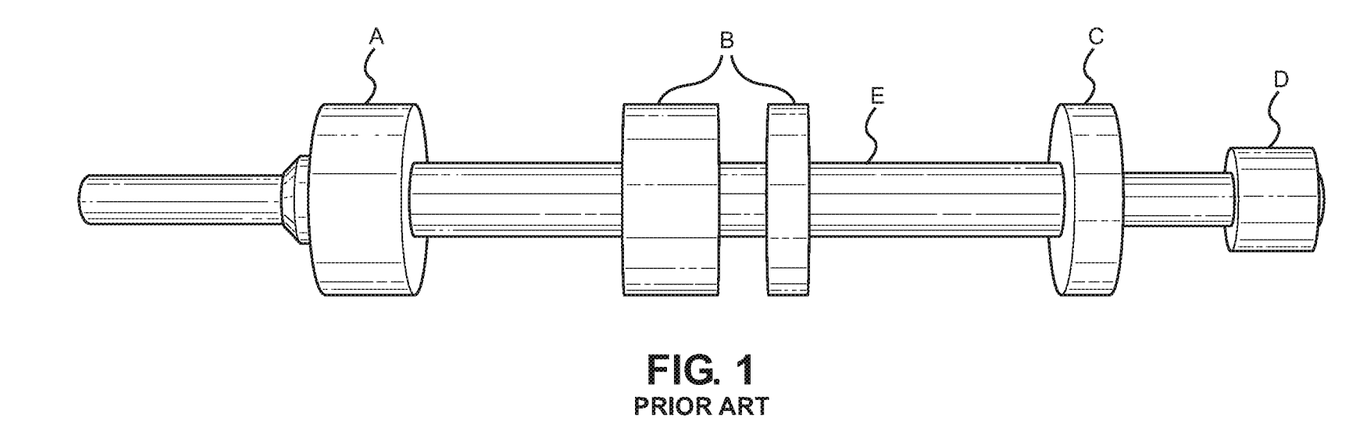
FIG. 1 is an illustration of an original equipment manufacturer pressure regulator valve initially installed in a transmission.

With continued reference to the drawings, an OEM pressure regulator valve is shown in FIG. 1. This pressure regulator valve comes installed within a valve body of a Ford 5R110W transmission, and other transmissions based upon the 5R110W design. The OEM pressure regulator has a first land (A), a second land (B), a third land (C), a fourth land (D), and a valve stem (E). The valve stem is cylindrical and forms the length of the valve. A diameter of the valve stem varies between each land. The second land (B) has a gap forming two separate areas.

Figure 2:
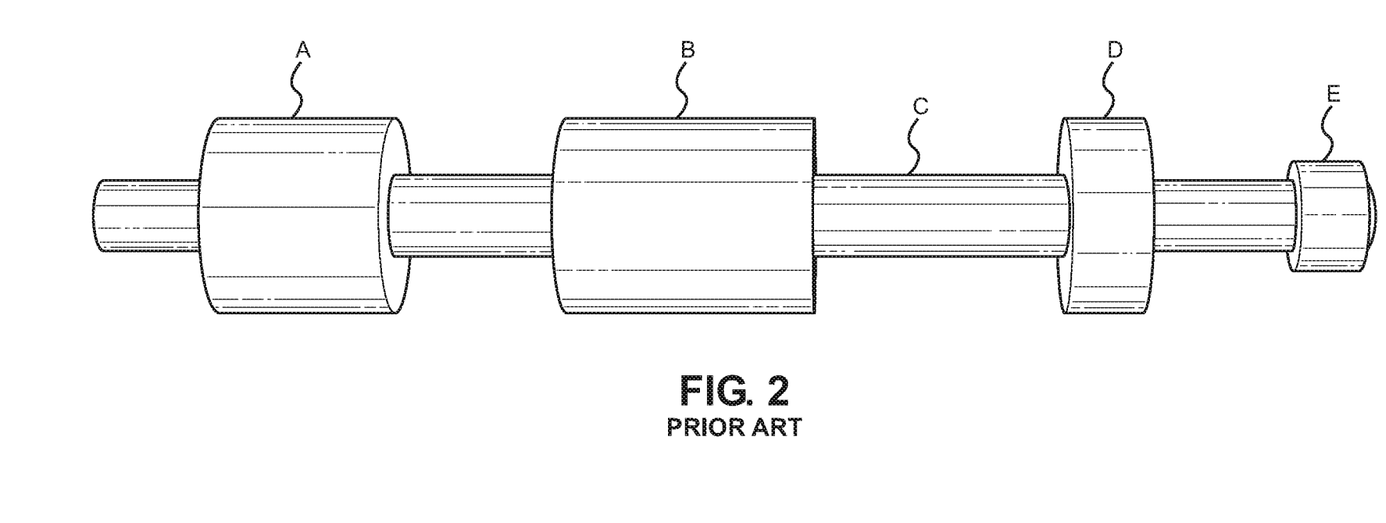
FIG. 2 is an illustration of a prior art replacement pressure regulator valve designed to replace the original equipment manufacturer pressure regulator shown in FIG. 1.

FIG. 2 shows a replacement pressure regulator valve designed and manufactured by TransGo®. The replacement pressure regulator has a first land (A'), a second land (B'), a third land (C'), a fourth land (D'), and a valve stem (E'). The valve stem (E') is cylindrical and forms the length of the valve. A diameter of the valve stem (E') varies between each land. By comparing FIGS. 1 and 2, the replacement valve has noticeably longer first, second, and third lands relative to the OEM pressure regulator valve. However, the replacement valve has land diameters identical to the OEM pressure regulator valve. Further, there is no gap in the second land (B') as found in the OEM valve.

Figure 3A:
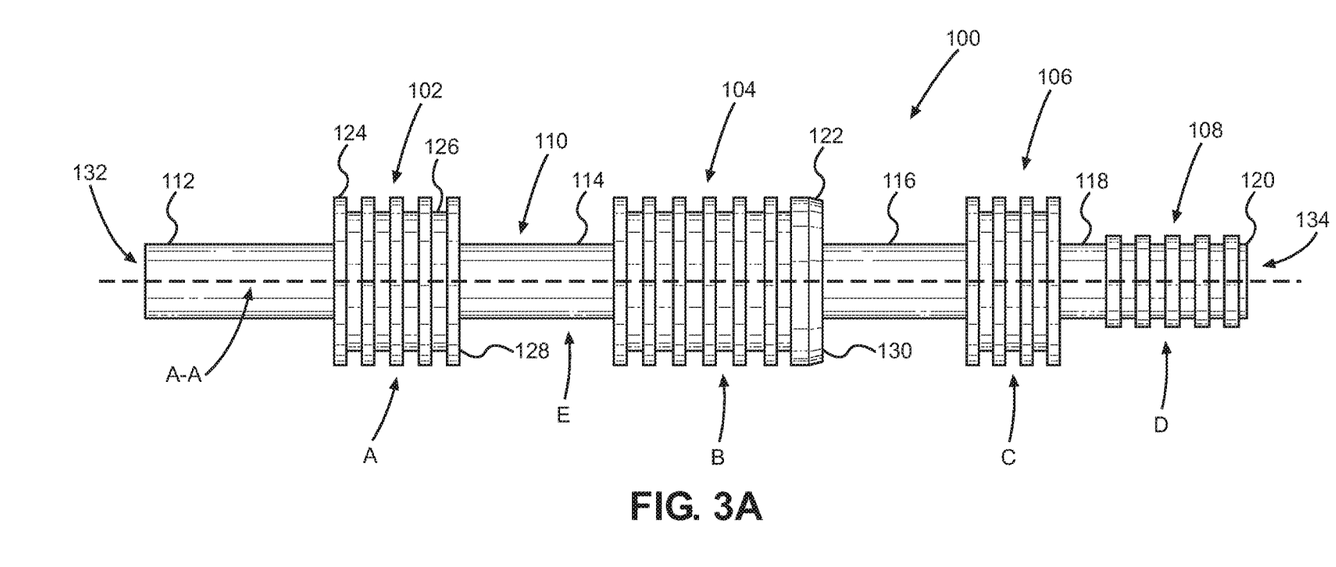
FIG. 3A is side view of a pressure regulator valve according to a preferred embodiment of the present invention.
Figure 3B:
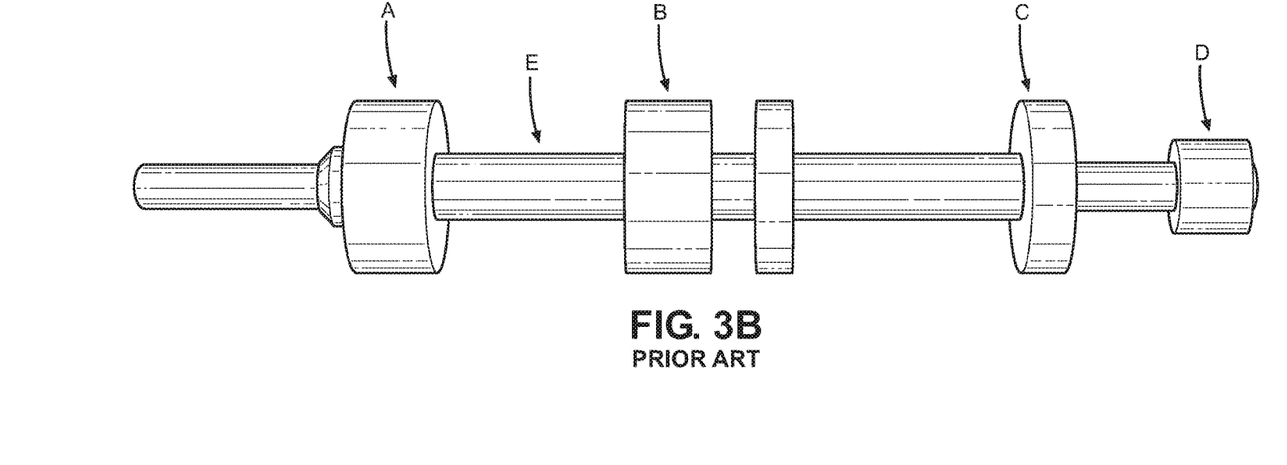
FIG. 3B is a side view of the original equipment manufacturer pressure regulator shown in FIG. 1 provided to provide a reference to the pressure regulator valve illustrated in FIG. 3A.
Figure 4:
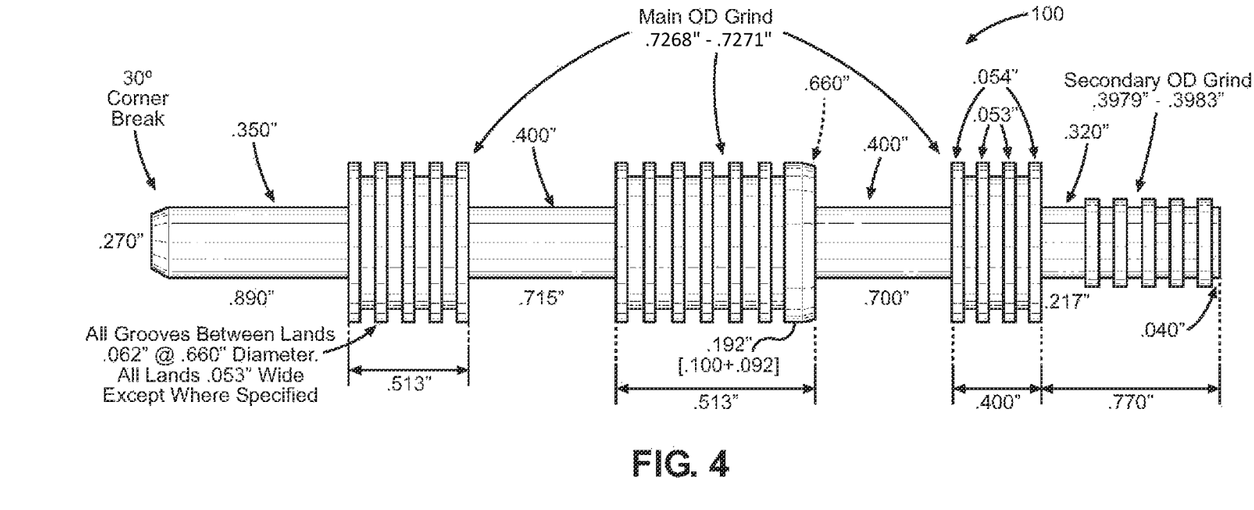
FIG. 4 is a side view of the pressure regulator valve of FIG. 3A depicting measurements in inches of various elements of the preferred embodiment.

FIGS. 3A and 3B provide a comparison between a preferred embodiment of the present invention, namely an improved pressure regulator valve 100, and the OEM pressure regulator valve, also shown in FIG. 1. The pressure regulator valve 100 has a valve stem 110 that is cylindrical and extends to form the length of the valve. The valve stem 110 includes multiple sections between and on each side of multiple lands 102, 104, 106, and 108. The valve stem sections 112, 114, 116, 118, and 120 do not necessarily have one consistent diameter between each section. However, the diameter of each valve stem section 112, 114, 116, 118, or 120 is less, or narrower, than lands 102, 104, 106, and 108. With reference to FIG. 4, dimensions of each valve stem section are provided for the preferred embodiment of the improved pressure regulator valve 100. Valve stem section 112 has a diameter of 8.89 mm (0.350 in) and a length of 22.606 mm (0.890 in). Valve stem section 114 has a diameter of 10.16 mm (0.400 in) and a length of 18.161 mm (0.715 in). Valve stem section 116 has a diameter of 10.16 mm (0.400 in) and a length of 17.78 mm (0.700 in). Valve stem section 118 has a diameter of 8.128 mm (0.320 in) and a length of 5.5118 mm (0.217 in). Valve stem section 120 has a diameter of 8.128 mm (0.320 in) and a length of 1.016 mm (0.040 in). Some variance in dimensions of each valve stem section 112, 114, 116, 118, and 120 is permissible.

Referring back to FIG. 3A, a first land 102, a second land 104, a third land 106, and a fourth land 108 are spaced along the length of the valve stem 110 in said order. Each of the first land 102, second land 104, third land 106, and fourth land 108 are cylindrical and concentric with the valve stem along axis A-A. To provide additional clearance for an adequate boundary layer or constant flowing film of ATF between the pressure regulator valve 100 and a bore, the lands 102, 104, 106, and 108 have reduced diameters compared to OEM and prior art pressure regulator valves. The reduced diameter of lands 102, 104, and 106 allows the pressure regulator valve to effectively hydroplane on ATF rather than scrape the bore when clearance is below ATF sheer thickness. Lands 102, 104, and 106 of the preferred embodiment have a diameter equal to or less than 18.4683 mm (0.7271 in), and preferably between 18.4607 mm (0.7268 in)-18.4683 mm (0.7271 in), inclusive. Land 108 of the preferred embodiment has a diameter 10.1117 mm (0.3981 in)-10.1041 mm (0.3978 in), inclusive. Both of these ranges are below the respective diameters of OEM pressure regulator lands A, B, C, and D.

Reduced diameters of the lands 102, 104, 106, and 108 provide multiple advantages over the OEM valve and known after-market valves. First, there is increased room for an adequate ATF boundary layer between the valve 100 and bore to insure that the valve does not scrape the bore and causing wearing or damage. Second, the increased room allows for particulates, such as metal and carbon flakes, to be flushed. Such particulates in the OEM and after-market valves cause sticking and damage as they are ground between valve and bore. Third, the reduced diameters help compensate for casting swell and resulting bore size reduction due to heat expansion during use. Lastly, the reduced diameters provide additional clearance within the bore to compensate for bore flex. Bore flex is a slight loss of concentricity of casting circles along the length of the bore under high pressure conditions.

Further, each land 102, 104, 106, and 108 is grooved with multiple concentric grooves 126 machined or otherwise formed into the outer circumference of each land. The concentric grooves create multiple concentric raised bands 124 along each land, with the collective concentric raised bands together providing the actual diameter for each land. Each concentric band of a respective land has the same diameter. However, the width of concentric raised bands may differ between other concentric raised bands of the same land and/or other lands. Concentric grooves allow tiny particles to collect within the grooves instead of sticking between the lands and bore. Sticking of tiny particles creates grinding between lands and bore, which damages both. Further, breaking up land length with multiple concentric grooves 126 reduces overall valve to bore surface contact area. Less surface contact area results in a lower coefficient of friction, which decreases bore and valve wear.

Specifically concerning the second land 104, an end 130 of the second land closest to the third land 106 has a beveled edge 122. The beveled edge 122 is a critical component to the present invention. Known pressure regulator valves all have square lands, or edges at 90 degrees, which create pulsed exhaust of a large volume of fluid as the regulator cycles in and out. This large, pulsed exhaust creates noise, or a strong line pressure oscillation, seen as a needle bounce on a pressure gauge. The pressure oscillation for square lands is typically between 137.895-275.79 kPa (20-40 PSI). However, with a beveled edge, the pressure valve meters exhaust at a progressive rate, thereby stabilizing pressure regulation, quieting noise, and reducing bore wear by shortening and slowing valve cycling.

The beveled edge 122 also provides increased torque converter and cooler feed. Since a pulsed regulator spends half of a cycle in a closed state, secondary circuits, such as a torque converter feed, become flow limited. However, flow to torque converter circuit is increased when regulation is stabilized through metered exhaust. The pressure regulator valve then favors a flow controlled open state. Additionally, torque converter flow displacement, or how far opened the first land 102 is from a pump casting, is determined by a distance from a line pressure regulating edge of the second land 104, or edge 130. Since line pressure is regulated with the beveled edge 122, and even hot or under high pressure conditions it is regulated at a mid-point of the beveled edge or beyond, the converter land is opened farther, and the torque converter circuit is given priority. Typical OEM cooler pressure/flow is 7.57082 liters per minute (2 gallons per minute) at 137.895 kPa (20 PSI), whereas cooler pressure/flow using the preferred embodiment of the present invention is 15.1416 liters per minute (4 gallons per minute) at 275.79 kPa (40 PSI), even at 2413.17 kPa (350 PSI) line pressure.

Referring to FIG. 4, the reduced diameters of each land relative to OEM and after-market valves has been previously discussed. Lands 102, 104, and 106 of the preferred embodiment have a diameter equal to or less than 18.4683 mm (0.7271 in), and preferably between 18.4607 mm (0.7268 in)-18.4683 mm (0.7271 in), inclusive. Land 108 of the preferred embodiment has a diameter 10.1117 mm (0.3981 in)-10.1041 mm (0.3978 in), inclusive. Both of these ranges are below the respective diameters of OEM pressure regulator lands A, B, C, and D as seen in FIG. 3B. Further, each land 102, 104, 106, and 108 has been lengthened so that the valve 100 is axially supported in an unworn portion of bore when the valve replaces an OEM valve. As such, the valve 100 is usable as a "drop-in" repair for a slightly worn or damaged bore once the bore properly cleaned. The "drop-in" design of the lengthened lands bypasses complex and labor-intensive machining and re-boring processes needed for some known after-market valves.

Each concentric groove 126 in lands 102, 104, and 106 are 1.5748 mm (0.062 in) in length and have a diameter of 16.764 mm (0.660 in). All concentric raised bands 124 are 1.3462 mm (0.053 in) in length, unless otherwise specified. These dimensions are the standard for concentric grooves 126 and concentric raised bands 124 in the preferred embodiment for lands 102, 104, and 106. The first land 102 has a length of 13.0302 mm (0.513 in), and all concentric grooves 126 and raised concentric bands 124 are of standard dimensions. The second land 104 is 22.4028 mm (0.882 in) in length, including the beveled edge 122. Each concentric groove 126 of the second land 104 is of standard dimensions. Each concentric raised band 124 of the second land 104 is of standard dimensions, except the raised based integrally formed with the beveled edge 122, which is 2.54 mm (0.100 in) in length. The beveled edge is 2.3368 mm (0.092 in) in length and tapers down to a diameter of 16.764 mm (0.660 in). The third land 106 is 10.16 mm (0.400 in) in length, has standard dimension concentric grooves, and has standard dimension concentric raised bands, except that the two raised bands on either end of the third land are 1.3716 mm (0.054 in) in length, instead of the standard 1.3462 mm (0.053 in). The fourth land 108 is 13.0302 mm (0.513 in) in length. The concentric grooves 126 of the fourth land 108 are 1.5748 mm (0.062 in) in length, but are 8.128 mm (0.320 in) in diameter, similar to valve stem sections 118 and 120. The concentric raised bands 124 are also 1.3462 mm (0.053 in) wide.

Figure 5:
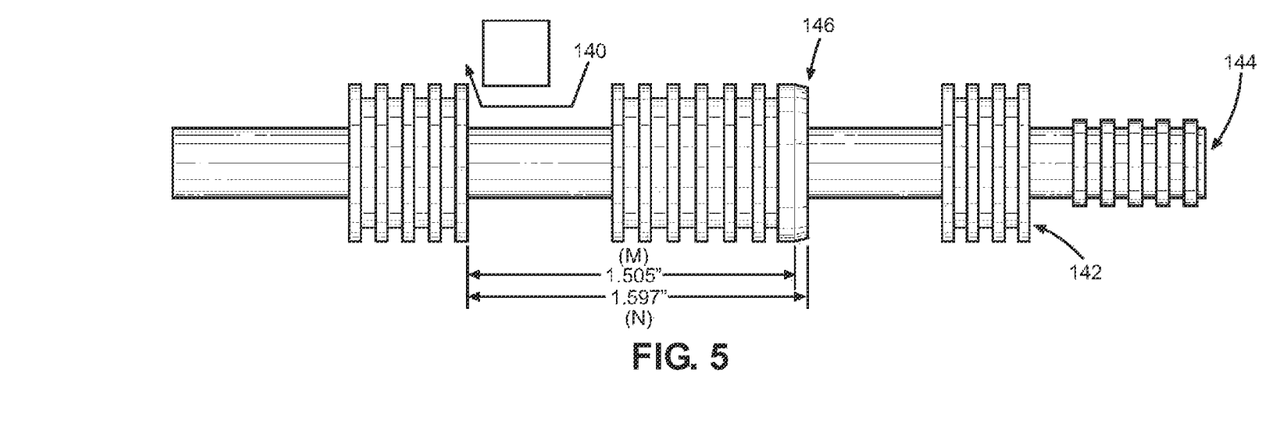
FIG. 5 is a side view of the pressure regulator valve of FIG. 3A depicting a preferred location of a bevel on a second land of the preferred embodiment.

With reference to FIG. 5, several further areas of the preferred embodiment are described. A vented end 144 is located at a lengthwise end of the valve stem 110 closest to the fourth land 108. A line pressure differential area 142 is located along an end of the third land 106 meeting the valve stem section 118. A line to torque converter and cooler 140, as discussed above is present between the first and second lands 102 and 104.

Figure 6:
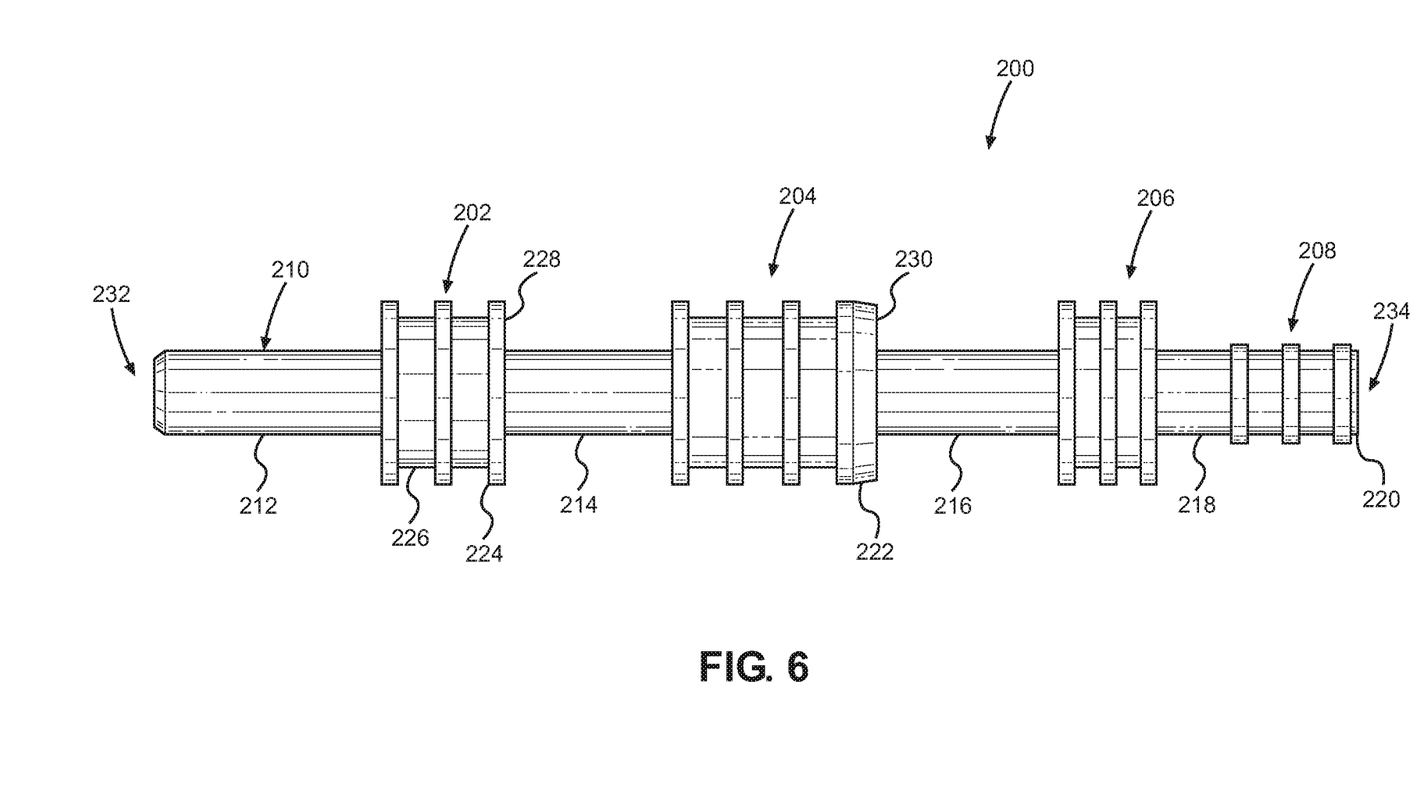
FIG. 6 is a side view of a pressure regulator valve according to another embodiment of the invention with a different orientation of grooves on each land.

With reference to FIG. 6, an alternate embodiment of the improve pressure regulator valve 200 is shown. This embodiment 200 retains the primary improvements of the preferred embodiment 100, such as a beveled edge 222, four lands 202, 204, 206, and 208 with reduced diameters, and lands with concentric grooves 226. However, the spacing of the concentric grooves 226, i.e. length, is greater in this embodiment. Therefore, fewer raised concentric bands 224 are formed on each land 202, 204, 206, and 208. Lands 202, 204, and 206 of this embodiment 200 have a diameter equal to or less than 18.4683 mm (0.7271 in), and preferably between 18.4607 mm (0.7268 in)-18.4683 mm (0.7271 in), inclusive. Land 208 of the preferred embodiment has a diameter 10.1117 mm (0.3981 in)-10.1041 mm (0.3978 in), inclusive. Both of these ranges are below the respective diameters of OEM pressure regulator lands A, B, C, and D of FIG. 3B. These ranges are the same as the ranges for the corresponding element in preferred embodiment 100. The valve stem 200 includes multiple sections between and on each side of multiple lands 202, 204, 206, and 208. Specifically concerning the second land 204, an end 230 of the second land closest to the third land 206 has a beveled edge 222. The valve stem sections 212, 214, 216, 218, and 220 do not have one consistent dimensions between each section. However, the diameter of each valve stem section 112, 114, 116, 118, or 120 are less, or narrower, than lands 102, 104, 106, and 108. The valve stem has oppositely oriented tapered end 232 and vented end 234. Other dimensions and features of the preferred embodiment 100 are applicable to this embodiment 200.

The pressure regulator valve 100 and all other possible embodiments are manufactured from industry standard materials, and any other suitable materials that may be machined to provide the appropriate structure described herein and properly function under typical operating conditions in 5R110W transmissions and transmissions based upon the 5R110W transmission.

The foregoing description of embodiments of the invention has been presented to illustrate the principles of the invention and not to limit the invention to the particular embodiments illustrated. It is intended that the scope of the invention be defined by all embodiments encompassed within the scope of the following claims and their equivalents.

I claim:

1. A method of reducing bore wear in a 5R110W automatic transmission, comprising:

removing an OEM (original equipment manufacturer) pressure regulator valve from a bore of a valve body of the 5R110W transmission;

inserting a replacement pressure regulator valve in the bore without enlarging the bore, the replacement pressure regulator valve comprising
    a cylindrical valve stem having an opposing first end and second end;
    a first land positioned along the valve stem near the first end;
    a second land positioned along the valve stem closer to the second end relative to the first land and spaced apart from the first land;
    a third land positioned along the valve stem closer to the second end relative to the second land and spaced apart from the second land;
    a fourth land positioned along the valve stem closer to the second end relative to the third land and spaced apart from the third land;
    wherein each of the first land, the second land, the third land, and the fourth land are grooved;
    wherein each of the first land, the second land, the third land, and the fourth land have a replacement diameter less than 18.4708 mm (millimeters) and said replacement diameter is smaller than an OEM diameter of corresponding lands of the OEM pressure regulator valve for the 5R110W transmission; and
    wherein an end of the second land closest to the third land is beveled;

reducing cycle rate and distance of the replacement pressure regulator valve compared to the OEM pressure regulator valve;

metering fluid exhaust at a progressive rate to quiet pressure oscillation and shorten and slow a fluid exhaust cycle;

creating a boundary layer of fluid between the first land, the second land, the third land, and the fourth land and the bore; and reducing an overall frictional drag coefficient between the replacement pressure regulator valve and the bore, and wherein average fluid flow through the replacement pressure regulator valve increases to 15.1416 liters per minute.

2. The method of claim 1, further comprising regulating torque converter line pressure with the beveled end of the second land, such that a torque converter circuit is given priority and average fluid flow through the replacement pressure regulator valve increases over average fluid flow in the OEM pressure regulator valve.

3. The method of claim 1, wherein the replacement diameter of each of the first, second, and third lands is between 18.46072 mm and 18.4683 mm, inclusive.

4. The method of claim 1, wherein the bevel is located between 36.83 mm and 41.91 mm measured from an end of the first land that is closest to the second land to the end of the second land.

5. The method of claim 1, wherein the first land has a length of 13.0302 mm, the second land has a length of 22.4028 mm, the third land has a length of 10.16 mm, and the fourth land has a length of 13.0302 mm.

6. The method of claim 1, wherein a first section of the valve stem between the first end of the valve stem and first land has a length of 22.606 mm and has a diameter of 8.89 mm, a second section of the valve stem between the first land and the second land has a length of 18.161 mm and has a diameter of 10.16 mm, a third section of the valve stem between the second land and the third land has a length of 17.78 mm and a diameter of 10.16 mm, a fourth section of the valve stem between the third land and fourth land has a length of 5.5118 mm and has a diameter of 8.128 mm, and a fifth section between the fourth land and the second end of the valve stem has a length of 1.016 mm and has a diameter of 8.128 mm.

7. The method of claim 6, wherein the first end of the valve stem is beveled and has a diameter of 6.858 mm.

8. The method of claim 1, wherein grooves of each of the first land, second land, third land, and fourth land are formed by alternating raised and depressed areas.

9. The method of claim 8, wherein each of the first land, second land, third land, and fourth land have at least three raised areas and two depressed areas.

10. A method of reducing bore wear in an automatic transmission, comprising:
   removing an OEM (original equipment manufacturer) pressure regulator valve from a bore of a valve body of the automatic transmission;
   inserting a replacement pressure regulator valve in the bore without enlarging the bore, the replacement pressure regulator valve comprising
      a cylindrical valve stem having an opposing first end and second end;
      a first land positioned along the valve stem near the first end;
      a second land positioned along the valve stem closer to the second end relative to the first land and spaced apart from the first land;
      a third land positioned along the valve stem closer to the second end relative to the second land and spaced apart from the second land;
      a fourth land positioned along the valve stem closer to the second end relative to the third land and spaced apart from the third land;
      wherein each of the first land, the second land, the third land, and the fourth land are grooved;
      wherein each of the first land, the second land, the third land, and the fourth land have a replacement diameter less than 18.4708 mm (millimeters) and said replacement diameter is smaller than an OEM diameter of corresponding lands of the OEM pressure regulator valve for the automatic transmission; and
      wherein an end of the second land closest to the third land is beveled, and
   wherein average fluid flow through the replacement pressure regulator valve increases to 15.1416 liters per minute.

* * * * *